US008789268B2

(12) United States Patent
Adair et al.

(10) Patent No.: US 8,789,268 B2
(45) Date of Patent: Jul. 29, 2014

(54) SYSTEM FOR FORMING A FREQUENCY SELECTIVE PATTERN

(75) Inventors: Emerald J. Adair, Vail, AZ (US); Gray E. Fowler, Allen, TX (US)

(73) Assignee: Raytheon Company, Waltham, MA (US)

( * ) Notice: Subject to any disclaimer, the term of this patent is extended or adjusted under 35 U.S.C. 154(b) by 1922 days.

(21) Appl. No.: 11/650,243

(22) Filed: Jan. 5, 2007

(65) Prior Publication Data

US 2008/0165075 A1 Jul. 10, 2008

(51) Int. Cl.
*B23P 19/00* (2006.01)

(52) U.S. Cl.
USPC ................................ 29/745; 29/846; 427/97.3

(58) Field of Classification Search
USPC ................ 156/273.7; 174/257, 261; 343/872; 427/97.3; 29/600, 601.1, 825, 846, 29/851, 852, 602.1, 729, 745
See application file for complete search history.

(56) References Cited

U.S. PATENT DOCUMENTS 4,159,414 A * 6/1979 Suh et al. ........................ 29/851
4,710,253 A * 12/1987 Soszek ....................... 156/273.7
6,788,271 B1 * 9/2004 Koo et al. ....................... 29/600
7,062,849 B2 * 6/2006 Ohashi et al. .................. 29/852

* cited by examiner

*Primary Examiner* — Donghai D. Nguyen
(74) *Attorney, Agent, or Firm* — Schwegman, Lundberg & Woessner, P.A.

(57) ABSTRACT

A system and method for forming a conductive pattern. In the illustrative embodiment, the system includes an applicator for applying a conductive substance onto a surface of a structure and a mechanism for precisely moving the applicator such that the conductive substance is applied in a desired pattern. In an illustrative embodiment, the mechanism includes a robotic arm driven by commands from a computer, and the conductive pattern is designed to manipulate the electromagnetic properties of the structure. The system can be used to apply a conductive pattern directly onto an electromagnetic component, such as a radome, IR dome, multi-mode dome, or flat plate EM window, or to apply a conductive pattern onto a component mold during the component fabrication process. In the latter case, the conductive pattern is an integrated part of the component.

19 Claims, 3 Drawing Sheets

SYSTEM FOR FORMING A FREQUENCY SELECTIVE PATTERN

BACKGROUND OF THE INVENTION

1. Field of the Invention

The present invention relates to electromagnetic components. More specifically, the present invention relates to systems and methods for forming conductive patterns in radomes and other electromagnetic components.

2. Description of the Related Art

Electromagnetic (EM) windows, including radomes, IR domes, multi-mode domes, and flat plate EM windows (IR, RF, or multi-mode), hereafter referred to as domes, are structures used to protect electromagnetic devices, such as antennas or sensors mounted on missiles or aircraft, from environmental conditions. The structural and electromagnetic requirements of a dome are usually very stringent. The dome should be made of a material having sufficient strength to withstand weather conditions (rain, wind, hail, etc.) and the imposed aerodynamic loadings. The dome should also exhibit certain electromagnetic properties. For example, domes are typically designed to be transparent to EM signals at the frequencies transmitted and received by the system.

It is highly desirable that the signals can pass through the radome with no reflection or distortion. Since practically all dome materials have a dielectric constant different from that of air, most domes cause some reflections of energy at the dielectric interfaces. In systems where the reflections cannot be tolerated, it has become common practice to embed a wire grid into the dome material itself to aid in the transmission of microwave energy. The embedded wire grid appears inductive to the radio frequency signal and the inductance can be arranged to offset the capacitance of the dome material. By proper design, a dome can be built which will pass a band of frequencies centered on any desired operating radar frequency and/or reject undesirable frequencies.

Traditional radome design uses a dome-like shell of dielectric material having a thickness that is a one-half wavelength of a center frequency of operation for the antenna. The one-half wavelength thickness is optimal for RF (radio frequency) transmittance. For certain applications, it may be desirable to deviate from a traditional radome design for mechanical considerations. For example, it may be desirable to use a much thinner wall than is optimal for RF transmittance. In such cases, a wire grid can be used to compensate and shift the optimal transmittance frequency of the device to the desired operating frequency.

The wire grids should have very precise line widths and spacing for optimal performance. Current methods for fabricating radomes with wire grids, however, are not capable of the high precision and accuracy required. Wire grids are typically placed by hand and glued onto the radome dielectric structures. This method is inherently imprecise as well as expensive. The same is true for IR and multi-mode domes.

A frequency selective surface, comprised of a pattern of conductive elements formed on a dielectric surface, can also be applied on a dome to selectively allow certain signals to pass through while rejecting other signals. Typically, the conductive elements are often configured as closed loops, square loops, or circular loops. Generally speaking, the dimensions and spacing of the conductive elements determine the pass bands and rejection bands.

Frequency selective surfaces are typically fabricated using conventional etching techniques. The accuracy of the frequency selectivity of the surface depends on the precision of the pattern formed on the surface. Any curvature in the surface complicates the pattern and makes the achievement of precise frequency selectivity extremely difficult. This is especially true in the case of complexly curved surfaces typical of dome designs. Currently, there is no known method for patterning curved surfaces to achieve precise frequency selectivity in a cost effective manner.

Hence, a need exists in the art for an improved system or method for forming a conductive pattern for more precisely controlling the electromagnetic properties of a dome.

SUMMARY OF THE INVENTION

The need in the art is addressed by the system for forming a conductive pattern of the present invention. The novel system includes an applicator for applying a conductive substance onto a surface of a structure and a mechanism for precisely moving the applicator such that the conductive substance is applied in a desired pattern. In an illustrative embodiment, the mechanism includes a robotic arm driven by commands from a computer, and the conductive pattern is designed to manipulate the electromagnetic properties of the structure. The system can be used to apply a conductive pattern directly onto an electromagnetic component such as a radome, or it can be used to apply a conductive pattern onto a component mold during the component fabrication process. In the latter case, the conductive pattern becomes an integrated part of the component.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
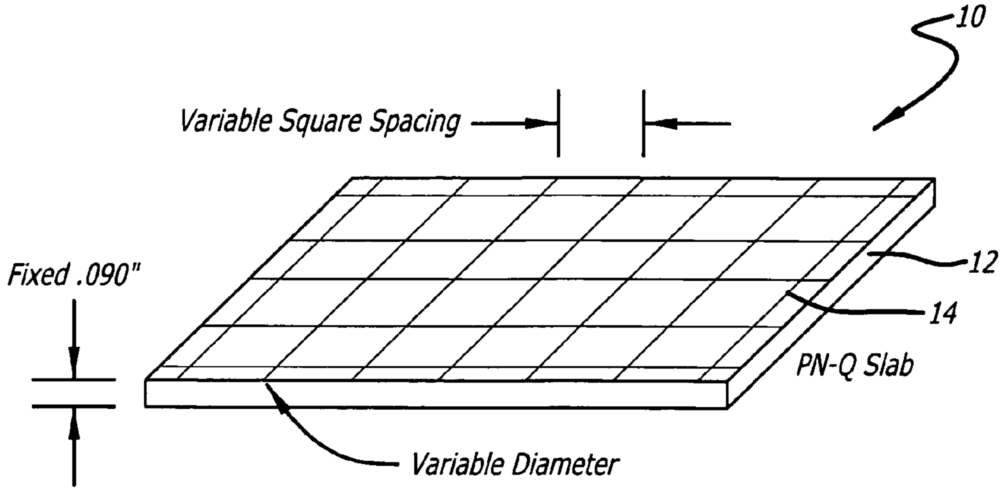
FIG. 1 (Prior Art)
FIG. 1 is a diagram of a section of an illustrative dome.

As is well known in the art, a wire grid or other conductive pattern can be placed in or on a dielectric substrate to manipulate the electromagnetic properties of a radome. FIG. 1 is a diagram of a section of an illustrative dome 10 formed from a dielectric shell 12 having a predetermined thickness and a wire grid 14. The grid spacing and wire diameter of the wire grid 14 determine the pass bands and rejection bands of the dome 10.

Figure 2A:
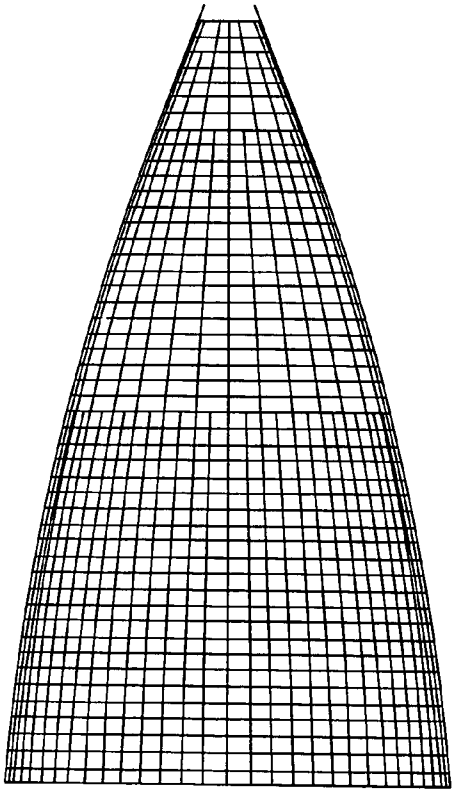
FIG. 2a (Prior Art)
FIG. 2*a* is diagram of an illustrative wire grid having a converging grid design.
Figure 2B:
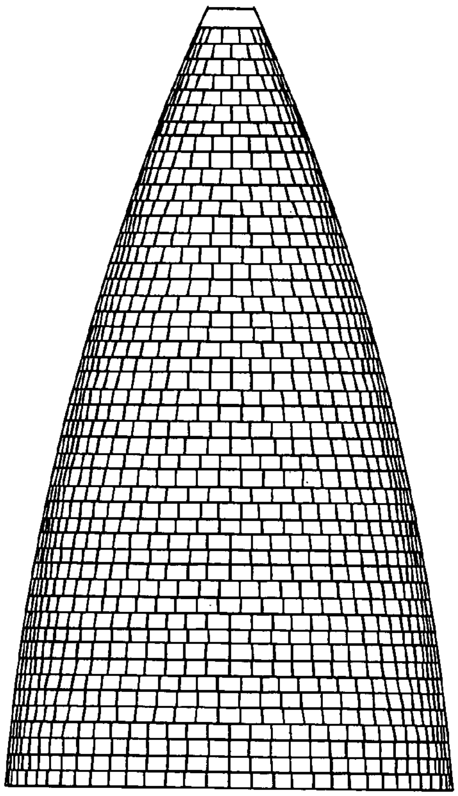
FIG. 2b (Prior Art)
FIG. 2*b* is diagram of an illustrative wire grid having a consistent grid (broken line) design.

Several different wire grid designs or frequency selective patterns are known in the art. For example, FIG. 2*a* shows an illustrative wire grid having a converging grid design, and FIG. 2*b* shows a wire grid having a consistent grid (broken line) design. The accuracy of the frequency selectivity of the wire grid or frequency selective surface depends on the precision of the conductive pattern formed on the surface.

The present invention teaches a novel method for precisely forming a conductive pattern for a radome or other electromagnetic component. The novel method uses a robotic system to precisely apply a conductive substance to the surface of a structure in a desired pattern. The precision of the novel system allows for high accuracy discrimination between desired and undesired frequency bands, as well as desired conductivities for specific applications. In a preferred embodiment, the conductive substance is applied to a component mold as part of the component fabrication process. The conductive pattern is thus integrated as part of the component.

Figure 3:
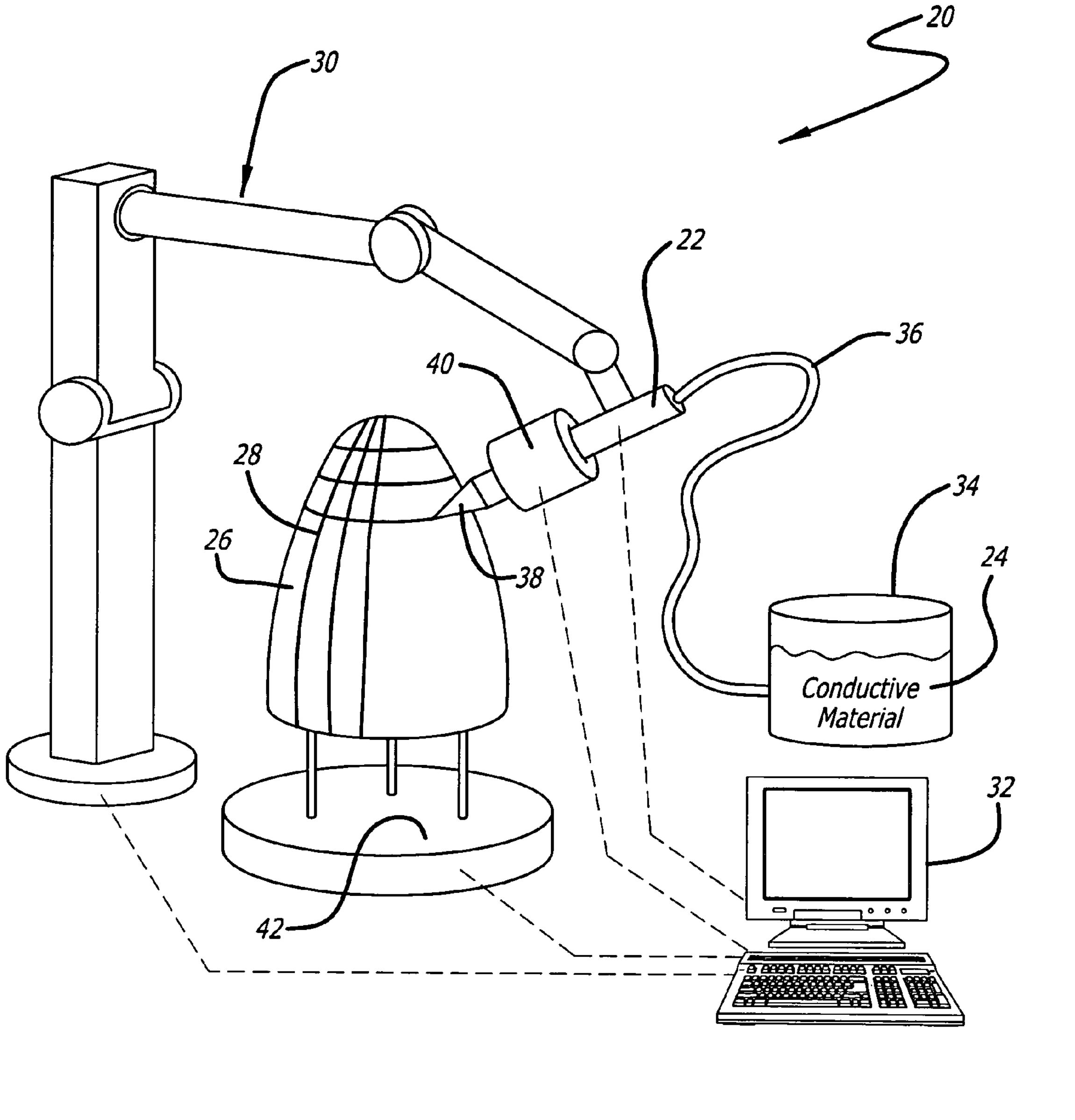
FIG. 3 is a simplified diagram of a system for forming a conductive pattern designed in accordance with an illustrative embodiment of the present invention.

FIG. 3 is a simplified diagram of a system 20 for forming a conductive pattern designed in accordance with an illustrative embodiment of the present invention. The system 20 includes a highly accurate electronic, chemical, and/or mechanical dispensing applicator 22 adapted to precision apply a conductive substance 24 onto the surface of a structure 26 in a desired pattern, for example, to form a wire grid 28. The precision applicator 22 is attached to a robotic arm 30 adapted to move and position the applicator 22 in response to commands from a computer 32. The computer 32 includes code for controlling the robotic arm 30 and applicator 22 to apply the conductive substance 24 to the structure 26 in the desired pattern. A container 34 holds a supply of the conductive material 24, which is fed to the applicator 22 by a tube 36.

In the illustrative embodiment, the applicator 22 is a highly controlled sized needle-like nozzle adapted to receive a supply of the conductive substance 24 and output a stream of the conductive material 24 (in liquid form). The applicator 22 may include a valve, pump, or other mechanism (not shown) for controlling the flow of conductive material out of the applicator 22 in response to commands from the computer 32. The applicator 22 may also include a removable tip 38, which can be exchanged for different applicator tips having different sized outputs. The size of the applicator tip 38 controls the diameter of the line of conductive material output by the applicator 22.

The system 20 may also include a heating element 40 coupled to the applicator 22 for controlling the temperature of the conductive substance during application to the structure 26. The conductive substance can then be applied at very high temperatures such that the conductive pattern is melted into the surface of the structure 26. This allows for actual penetration of the conductive substance into the surface of a glass or ceramic electromagnetic window, increasing the survivability of the conductive pattern.

The system 20 may also include a mechanism 42 for positioning the component 26. The mechanism 42 may include a fixed stand adapted to hold the component 26 in place during the application of the conductive material, or it may include a movable stand adapted to rotate, translate, or otherwise move the component 26 in response to commands from the computer 32. If a greater degree of freedom is desired, the mechanism 42 may include a second robotic arm adapted to hold and position the component 26 as instructed by the computer 32.

The system 20 can be adapted for use with a wide variety of conductive substances, either metallic or non-metallic. In an illustrative embodiment, the conductive substance 24 is a liquid, such as liquid silver or liquid copper. The conductive substance 24 may also be a solid. For example, the conductive substance 24 may be supplied as small pellets which are heated and transformed to a liquid by the heating element 40.

The surface of the structure 26 may be fabricated from any suitable material. A radome typically uses a composite or ceramic dielectric material, but any type of material can be used to form the structure 26, including metal. In an illustrative embodiment, the structure 26 is a radome shell fabricated from an organic polymer such as cyanate ester. In another illustrative embodiment, the structure 26 is a component mold made from polished metal.

The system 20 can be used to form any desirable conductive pattern by programming the computer 32 to "draw" the pattern onto the surface of the structure 26. In an illustrative embodiment, the computer 32 includes code adapted to receive the dimensions of the structure 26 and the desired conductive pattern, and output instructions for moving the robotic arm 30 and controlling the flow of the conductive substance from the applicator 22 such that the desired pattern is drawn onto the structure 26. The conductive pattern can be applied to the internal or external surface of the structure 26. The dimensions of the conductive pattern may vary in line width and/or spacing. The pattern can be single or multi-directional, continuous or discontinuous. By using this system 20, a continuous pattern can be formed without any breaks or seams.

The system 20 can be used to precisely apply a conductive pattern onto any structure 26, including structures having complex curvatures. The conductive pattern may be applied directly to the electromagnetic component (for example, directly to the internal or external surface of a radome shell), or it can be applied to the surface of a component mold during the component fabrication process. In the second case, the conductive pattern is integrated into the external layer of the component 26 (integrated as part of the surface).

Figure 4:
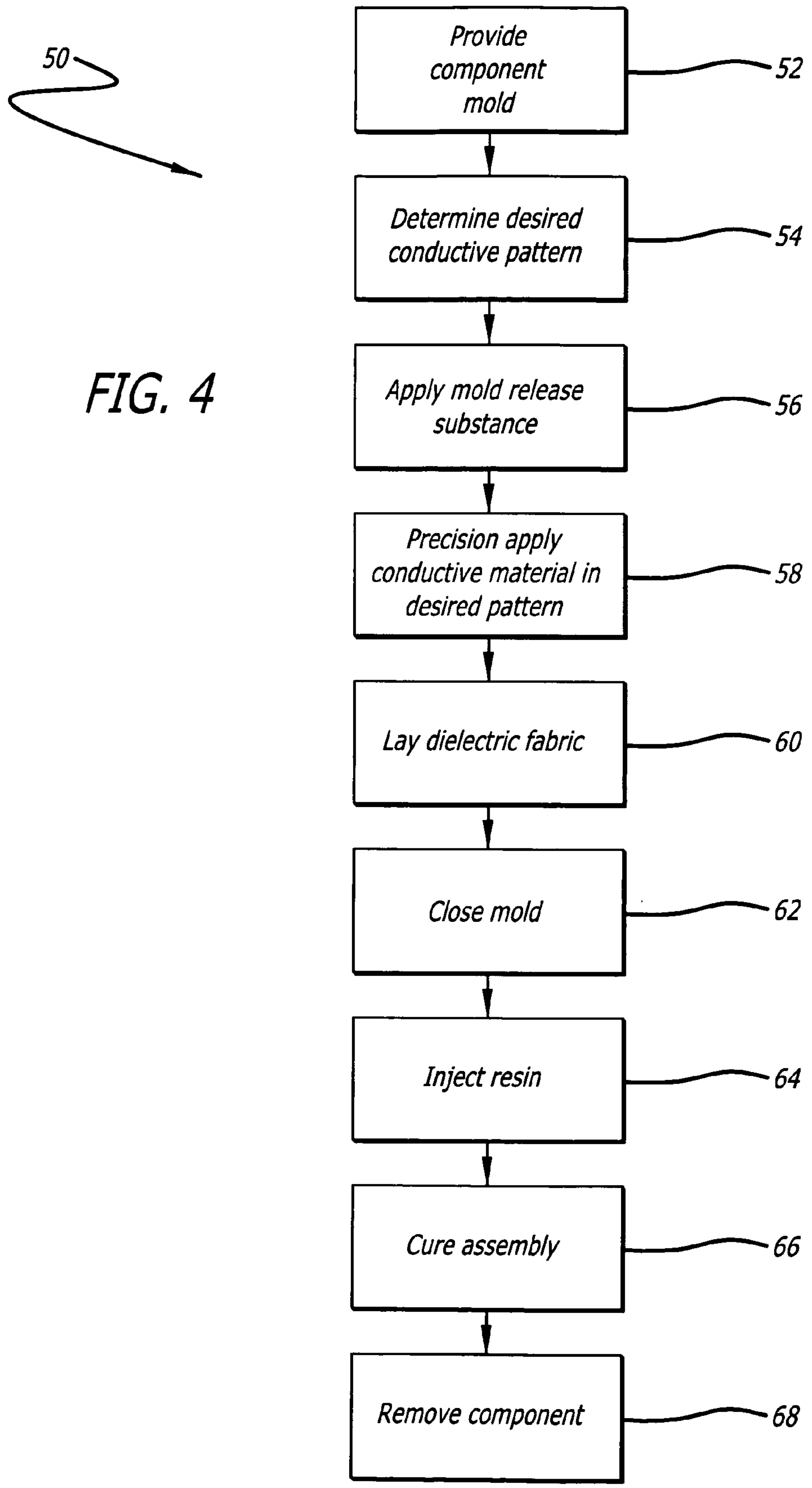
FIG. 4 is a flow diagram of an illustrative method for fabricating an electromagnetic component designed in accordance with the present teachings.

FIG. 4 is a flow diagram of an illustrative method 50 for fabricating an electromagnetic component (such as a radome) designed in accordance with the present teachings. First, at Step 52, provide a component mold having an interior whose shape corresponds to an exterior shape of the component, and at Step 54, determine the desired conductive pattern to be applied to the component. One of ordinary skill in the art can design an appropriate pattern to manipulate the electromagnetic properties of the component as desired, for example, to allow desired frequencies to be transmitted with minimal loss or distortion and undesired frequencies to be blocked/shielded or absorbed.

At Step 56, apply a mold release substance to the interior surface of the mold, which will allow the assembled component (including both the conductive pattern and the dielectric substrate) to be removed from the mold.

At Step 58, precision apply the conductive substance in the desired pattern to an interior surface of the mold, using a precision system 20 such as that shown in FIG. 3.

Next, apply the component material (which will form the structure of the component) to the mold. In the illustrative embodiment, this is performed using the following steps. Radomes are often formed using one or more layers of dielectric fabric. At Step 60, lay up the layer(s) of dielectric fabric onto the mold, over the conductive pattern. At Step 62, close the mold and at Step 64, vacuum inject a fluid heat-curable resin into the closed mold. The resin may be organic or inorganic.

At Step 66, apply the appropriate temperature to cure the component assembly, and finally at Step 68, remove the assembled component. The conductive pattern is removed along with the component, as an integrated part of the component structure.

Thus, the precision system 20 of the present invention can be used to form a conductive pattern by applying it directly to an electromagnetic component, or by applying it to a component mold during the fabrication process. The final product may include multiple different conductive substances on multiple molds for components. The novel system 20 allows for more capability and conductive patterns with more precise dimensions, size, and spacing. The system 20 can be used to form a conductive pattern from a wide range of conductive substances onto almost any structure, including components having complex curvatures. In addition, the system 20 allows for repeatability and reduction of cycle time, and therefore reduction of cost per unit.

Thus, the present invention has been described herein with reference to a particular embodiment for a particular application. Those having ordinary skill in the art and access to the present teachings will recognize additional modifications, applications and embodiments within the scope thereof. For example, while the invention has been described with reference to a radome application, the novel system and method can be used to form a conductive pattern for an IR dome, multi-mode dome, electromagnetic window, or any other electromagnetic structure without departing from the scope of the present teachings.

It is therefore intended by the appended claims to cover any and all such applications, modifications and embodiments within the scope of the present invention.

Accordingly,

What is claimed is:

1. A system for forming a frequency selective pattern on a curved surface of a dome, the system comprising:

a fixed stand for holding the dome in place;

a dispensing applicator to precision-apply a stream having a predetermined line width of a conductive substance onto the curved surface, the dispensing applicator comprising a highly controlled sized needle-like nozzle configured to receive a supply of the conductive substance and output the stream of the conductive substance in liquid form; and a robotic arm for precisely moving said dispensing applicator in response to control signals from a computer to apply the conductive substance in a desired pattern without movement of the dome, the desired pattern being configured to manipulate electromagnetic properties of the dome, wherein a flow of the conductive substance through the nozzle of the dispensing applicator is controlled by the computer to achieve the predetermined line width.

2. The system of claim 1 wherein said conductive pattern is configured to allow electromagnetic radiation of desired frequencies to be transmitted through said dome with minimal loss or distortion.

3. The system of claim 1 wherein said conductive pattern is configured to minimize transmission of electromagnetic radiation of undesired frequencies through said dome.

4. The system of claim 1 wherein said system further includes a heating element for controlling a temperature of said conductive substance.

5. The system of claim 1 wherein said system further includes a mechanism for controlling a position of said dome.

6. The system of claim 1 wherein said dome is an electromagnetic window.

7. The system of claim 1 wherein said dome is a mold for an electromagnetic window.

8. The system of claim 1 further comprising a heating element coupled to the applicator for controlling a temperature of the conductive substance during application to curved surface of the dome, wherein the computer is configured to control temperatures of the conductive substance for application at temperatures to allow the conductive pattern to be melted into the curved surface of the dome to provide for actual penetration of the conductive substance into the curved surface of the dome to increase survivability of the conductive pattern.

9. The system of claim 8 wherein the applicator includes a valve or a pump for controlling the flow of the conductive substance out of the dispensing applicator in response to commands from the computer.

10. The system of claim 9 wherein the nozzle of the dispensing applicator further includes a removable applicator tip configured to be exchanged for different sized applicator tips to produce different sized stream outputs, wherein a size of the applicator tip controls the diameter of the stream of conductive substance output by the dispensing applicator for determination of the predetermined line width.

11. The system of claim 8 wherein the conductive substance comprises either liquid silver or liquid copper.

12. The system of claim 8 wherein the conductive substance comprises solid pellets that are heated and transformed to the liquid by the heating element.

13. The system of claim 8 wherein the curved surface of the dome comprises a composite or a ceramic dielectric material.

14. The system of claim 8 wherein the curved surface is fabricated from an organic polymer comprising cyanate ester.

15. The system of claim 8 wherein the dispensing applicator is configured to apply the conductive substance to a curved internal surface of the dome.

16. The system of claim 8 wherein the dispensing applicator is configured to apply the conductive substance to a curved external surface of the dome.

17. The system of claim 8 wherein the dispensing applicator is configured to apply the conductive substance to an internal surface of a mold for a radome shell.

18. The system of claim 1 wherein the robotic arm is controllable by the computer to cause the conductive substance to form a continuous pattern without any breaks or seams on the curved surface.

19. The system of claim 1 wherein the dome is a radome.

* * * * *